United States Patent

Tanaka et al.

[11] Patent Number: 5,880,819
[45] Date of Patent: Mar. 9, 1999

[54] PHOTOGRAPHIC FILM LOADING METHOD, PHOTOGRAPHIC FILM CONVEYING APPARATUS, AND IMAGE READING APPARATUS

[75] Inventors: Shigeru Tanaka; Takehisa Ohno, both of Kanagawa, Japan

[73] Assignee: Fuji Photo Film Co., Ltd., Kanagawa, Japan

[21] Appl. No.: 670,602

[22] Filed: Jun. 26, 1996

[30] Foreign Application Priority Data

Jun. 29, 1995 [JP] Japan ................................. 7-164090

[51] Int. Cl.$^6$ .................................................. G03B 27/62
[52] U.S. Cl. .................................. 355/75; 355/40; 355/66; 226/91
[58] Field of Search ................................. 355/75, 76, 66, 355/40, 41; 352/157, 229, 230; 226/91

[56] References Cited

U.S. PATENT DOCUMENTS

| 3,271,099 | 9/1966 | Debrie ....................................... 352/299 |
| 3,878,114 | 4/1975 | Lancor et al. ............................ 352/157 |
| 4,761,675 | 8/1988 | Sawasaki ................................... 355/76 |
| 4,933,716 | 6/1990 | Imamura et al. ......................... 355/75 |
| 4,994,850 | 2/1991 | Imamura et al. ......................... 355/75 |
| 5,323,206 | 6/1994 | Hochreiter et al. ....................... 355/75 |
| 5,400,117 | 3/1995 | Fetterman et al. ....................... 355/75 |
| 5,550,613 | 8/1996 | Hasegawa et al. ....................... 355/41 |
| 5,592,258 | 1/1997 | Hashizume et al. ...................... 355/41 |

FOREIGN PATENT DOCUMENTS

| 7-159624 | 1/1997 | Japan . |
| 9-15738 | 1/1997 | Japan .............................. G03B 27/46 |
| 652223 | 4/1951 | United Kingdom ..................... 352/78 |

*Primary Examiner*—Alan A. Mathews
*Attorney, Agent, or Firm*—Sughrue, Mion, Zinn, Macpeak & Seas, PLLC

[57] ABSTRACT

A photographic film loading method of loading photographic film at an apparatus which has a carrier for holding and conveying the film along a conveying path and which effects photometry of each frame image of the film at a predetermined position of the conveying path, comprising the steps of: spanning the photographic film between a supply reel and a winding reel; the carrier having a first portion disposed so as to be fixed at the apparatus and a second portion movable between a first position, at which the photographic film located on the conveying path is held between the first portion and the second portion, and a second position, which is withdrawn from the first position such that release of the holding of the photographic film between the first portion and the second portion is permitted, drawing-out an intermediate portion of the photographic film between the supply reel and the winding reel while the second portion is located at the second position, so as to locate the intermediate portion on the conveying path; and moving the second portion to the first position to hold the photographic film, thereby completing loading of the photographic film. Therefore, the photographic film can be loaded at the carrier without conveying a leader portion of the photographic film along the conveying path, and damage to the leader portion and jamming of the photographic film can be prevented.

23 Claims, 13 Drawing Sheets

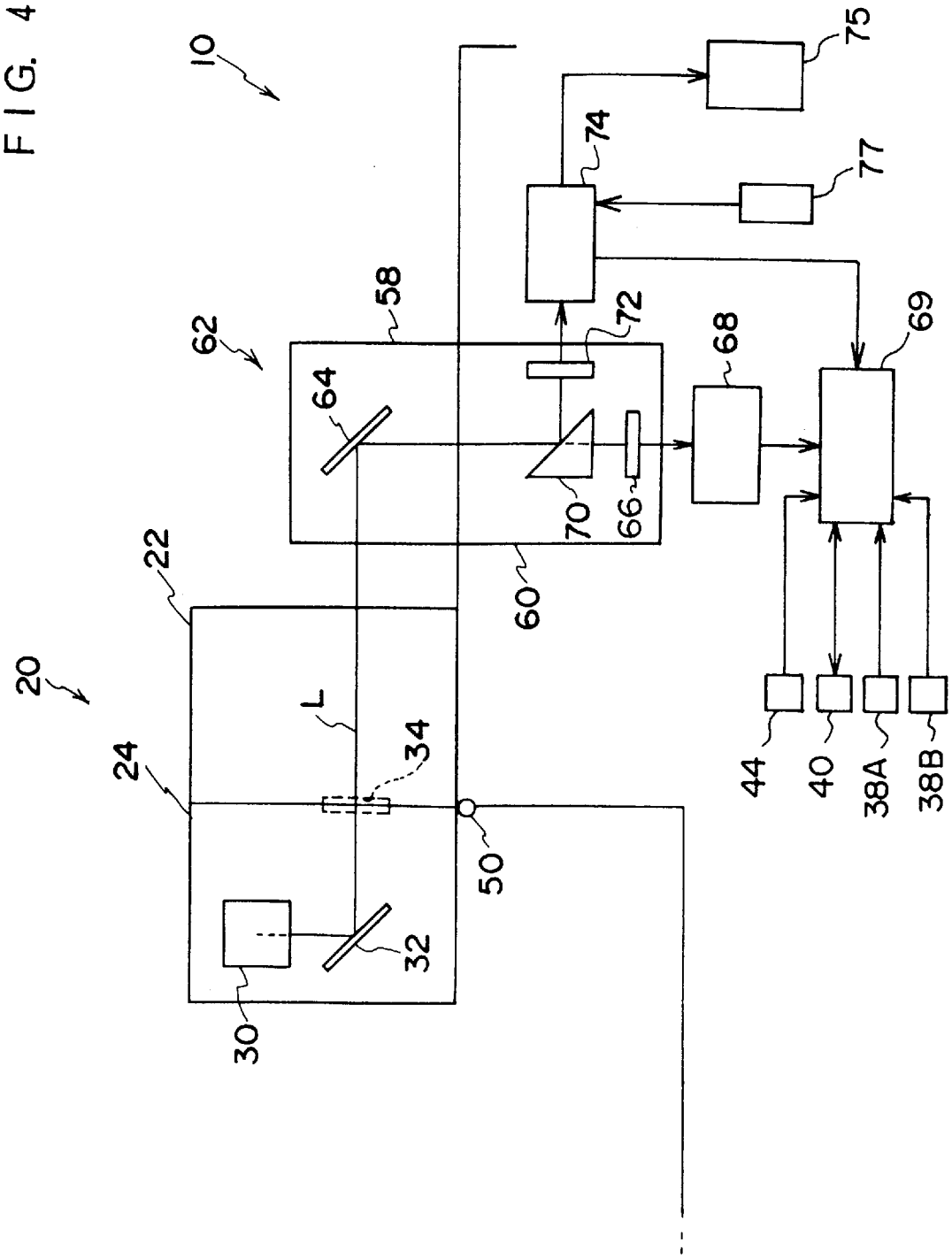

FIG. 10
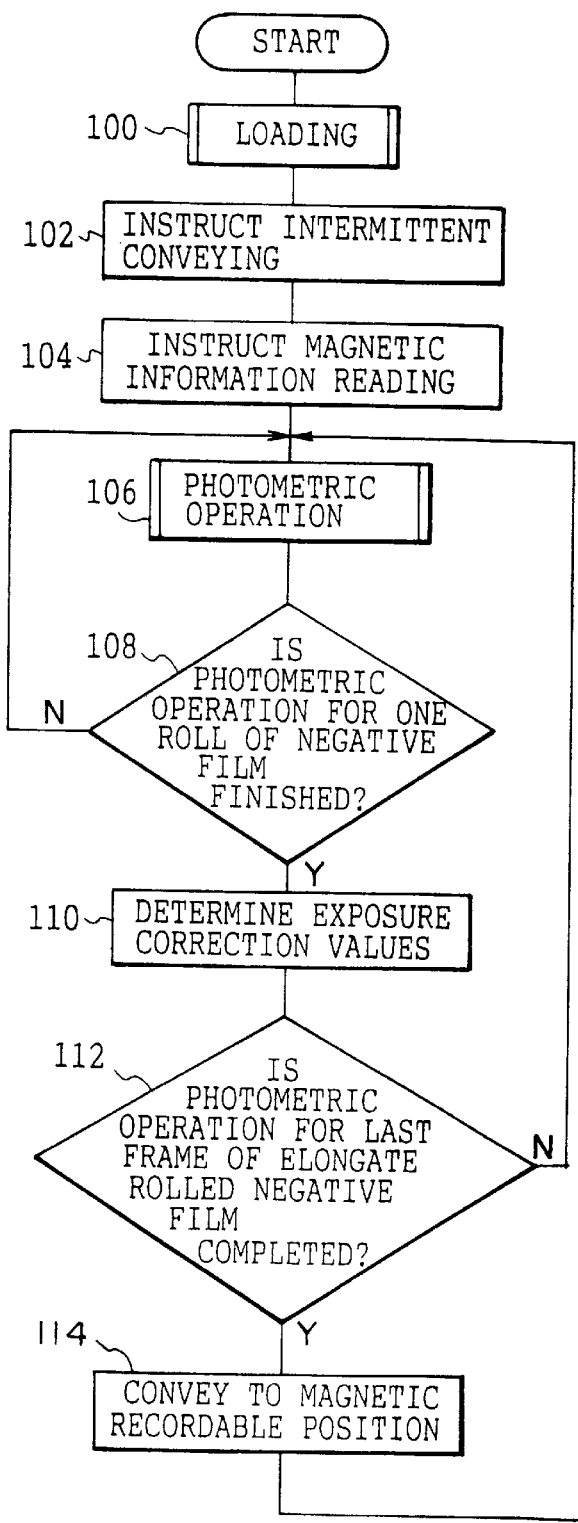
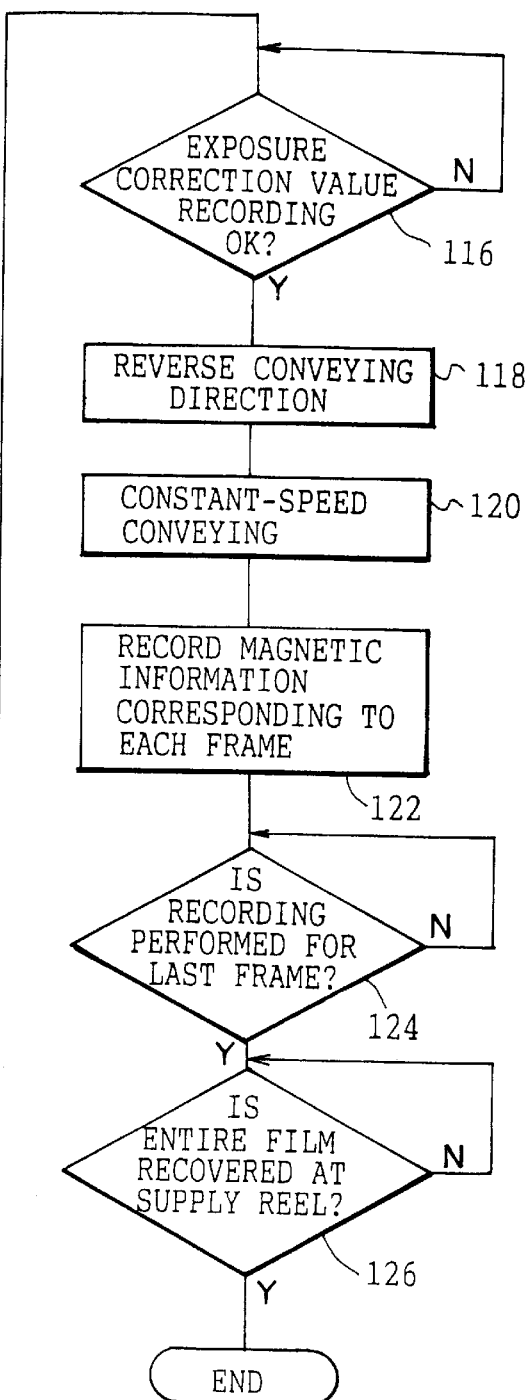

F I G. 1 1

|   | | EMULSION SURFACE | DRAWING-OUT LEADER |
|---|---|---|---|
| ① | IN  IN | NOT CHANGED | CHANGED |
| ② | IN / OUT | CHANGED | CHANGED |
| ③ | OUT / IN | CHANGED | CHANGED |
| ④ | OUT  OUT | NOT CHANGED | CHANGED |

PHOTOGRAPHIC FILM LOADING METHOD, PHOTOGRAPHIC FILM CONVEYING APPARATUS, AND IMAGE READING APPARATUS

BACKGROUND OF THE INVENTION

1. Field of the Invention

The present invention relates to an image reading apparatus, and to a film loading method and a film conveying apparatus which can be applied to an image reading apparatus and, more particularly, to a film loading method and a film conveying apparatus to which an elongate rolled photographic film which is prepared by joining a plurality of rolls of film together, is applied.

2. Description of the Related Art

Conventionally, each image on a photographic film is read by an image reading apparatus (scanner), and exposure correction data for the image is obtained by a video color analyzer and recorded on an LSI card or the like. In order to rapidly record a large amount of data, negative films of several rolls are joined in series by a splicer, and the resultant elongate negative film (i.e., the long strip formed by the plurality of rolls of films being spliced together) is rolled such that the emulsion surface thereof faces inward and the last frame of the negative film which was joined last serves as a drawing-out leader portion. The elongate rolled negative film thus prepared is set (loaded) at the scanner such that the leading end portion thereof (leader portion) is made to pass along a conveying path. Further, the elongate rolled negative film is transferred to subsequent processes in a rolled state, is subjected to a series of processings, and is finally cut by a cutter, thereby obtaining the respective negative films of each roll.

However, since the elongated photographic film applied to such an image reading apparatus has a rolled shape, jamming easily occurs because the leader portion is curled or bent. A portion at which jamming has occurred tends to become jammed again in the subsequent processes. In order to solve this drawback, several guides must be arranged on the conveying path. However, the guides complicate the structure around the conveying portion, and the apparatus cannot be made compact.

There are various manners of winding the rolled negative film (e.g., the front surface may face outward or inward, and winding may begin from the leading end or the trailing end). Therefore, a step of rewinding must be added in some cases to standardize the directions of the films in a predetermined process. For example, when printing is performed by a printer, the negative film must be wound such that the emulsion surface side of the film faces a predetermined side, e.g., the outer side, depending on the position of the light source arranged in the printer. However, negative films, which have been joined in series by a splicer and which are being used for reordering prints, are not subjected to a developing process. Therefore, the winding direction of such negative films when such negative films are supplied to the scanner is different from the winding direction of negative films which are subjected to simultaneous printing. Therefore, the winding direction of the rolled negative film for reordering and the winding direction of the rolled negative film for simultaneous printing are different. For this reason, a step of only rewinding the rolled negative film for simultaneous printing or for reordering must be added before the last step is finished. As a result, the throughput, or processability, of the negative film cannot be improved.

Japanese Patent Application No. 7-159624 is related art of the present application. Note that Japanese Patent Application No. 7-159624 is pending at the Japanese Patent Office, and is not publicly known at the time of filing of the present application.

SUMMARY OF THE INVENTION

In view of the above facts, the present invention has as its object to provide a film loading method, a film conveying apparatus, and an image reading apparatus in which a rolled photographic film is reliably loaded, and the throughput can be improved.

According to the first aspect of the present invention, there is provided a photographic film loading method of loading a photographic film at an apparatus which effects photometry of a frame image on the photographic film, comprising the steps of:

determining a loading direction and a winding direction of the photographic film on the basis of a winding manner of the photographic film before the photographic film is loaded at the apparatus and a winding manner of the photographic film after the photographic film is unloaded from the apparatus; and loading the photographic film at the apparatus on the basis of the determined results.

According to the above aspect, the photographic film is loaded at the apparatus after the loading direction and the winding direction of the photographic film have been determined on the basis of the winding manner of the photographic film before the photographic film is loaded at the apparatus and the winding manner of the photographic film after the photographic film is unloaded from the apparatus. Therefore, the photographic film which has been wound in the determined winding manner can be unloaded from the apparatus when each of the frame images of the photographic film has been subjected to photometric operation. In this manner, the photographic film can be wound in a desired winding manner without adding a step of rewinding, and the subsequent steps can be rapidly performed. As a result, the throughput of the photographic film can be improved.

According to the second aspect of the present invention, there is provided a photographic film loading method of loading an elongate photographic film at an apparatus which has a carrier for holding the photographic film to convey the photographic film along a conveying path and which effects photometry of each frame image of the photographic film at a predetermined position of the conveying path, comprising the steps of:

(a) spanning the photographic film between a supply reel and a winding reel;

(b) the carrier having a first portion disposed so as to be fixed at the apparatus and a second portion movable between a first position, at which the photographic film located on the conveying path is held between the first portion and the second portion, and a second position, which is withdrawn from the first position such that release of the holding of the photographic film between the first portion and the second portion is permitted, drawing-out an intermediate portion of the photographic film between the supply reel and the winding reel while the second portion is located at the second position, so as to locate the intermediate portion on the conveying path; and (c) moving the second portion to the first position to hold the photographic film, thereby completing loading of the photographic film.

According to the second aspect, the intermediate portion of the photographic film spanned between the supply reel and the winding reel is drawn-out in advance, and is placed on the conveying path while the second portion of the carrier is withdrawn to the second position. Thereafter, the second portion located at the second position is moved to the first position, and the intermediate portion is held between the first portion and the second portion. In this manner, loading of the photographic film on the apparatus is completed. Therefore, the photographic film can be set at the carrier without conveying the leader portion of the photographic film along the conveying path. For this reason, the photographic film can be easily and reliably loaded, and damage to the leader portion of the photographic film and jamming can be prevented.

According to the third aspect, in the second aspect, in the step (a), the photographic film is spanned between the supply reel and the winding reel in accordance with a loading direction and a winding direction of the photographic film which are determined on the basis of a winding manner of the photographic film before the photographic film is loaded at the apparatus and a winding manner of the photographic film after the photographic film is unloaded from the apparatus.

According to the third aspect, since the photographic film is spanned between the supply reel and the winding reel in the predetermined loading and winding directions, damage to the leader portion of the photographic film and jamming can be prevented. Further, a desired winding manner is obtained without adding a separate rewinding step, and the subsequent processes can be rapidly performed. As a result, the throughput or processability of the negative film can be improved.

According to the fourth aspect, there is provided a photographic film conveying apparatus, having a conveying path and including a carrier which holds an elongate photographic film and conveys the photographic film along the conveying path in a longitudinal direction of the photographic film, comprising:

a fixed portion forming a portion of the carrier and fixed to the film conveying apparatus;

a movable portion forming the remaining portion of the carrier; and connecting means for connecting the fixed portion and the movable portion and permitting pivoting of the movable portion to a first position, at which the photographic film located on the conveying path is held between the movable portion and the fixed portion so as to permit conveying of the photographic film, and to a second position, which is withdrawn from the first position and at which location of the photographic film on the conveying path and removal of the photographic film from the conveying path are permitted.

According to the fourth aspect, the movable portion can be pivoted about the connecting means with respect to the fixed portion of the carrier, and the photographic film is located on the conveying path when the movable portion is located at the second position. After the photographic film is located on the conveying path, the movable portion is pivoted at the first position to hold the photographic film. Therefore, the photographic film can be easily and reliably loaded at the photographic film conveying apparatus, and damage to the leader portion of the photographic film and jamming are prevented. As a result, the photographic film can be reliably conveyed.

In the fourth aspect, the movable portion can be pivoted by a drive means such as a motor through the connecting means. The connecting means may be a hinge.

According to the fifth aspect, there is provided an image reading apparatus which holds an elongate photographic film and conveys the photographic film along a conveying path and reads each frame image of the photographic film at a predetermined position on the conveying path, comprising:

a carrier having the conveying path, the carrier having a fixed portion fixed to the image reading apparatus and a movable portion which can be pivoted to a first position, at which the photographic film located on the conveying path is held between the movable portion and the fixed portion such that conveying of the photographic film is permitted, and to a second position, which is withdrawn from the first position such that location of the photographic film on the conveying path and removal of the photographic film from the conveying path are permitted;

drawing-out means for, while the movable portion is located at the second position, drawing-out an intermediate portion of the photographic film spanned between a supply reel and a winding reel to press the intermediate portion against the fixed portion and to locate the intermediate portion on the conveying path; and a first drive device for pivoting the movable portion from the second position to the first position to hold the intermediate portion between the first portion and the second portion such that conveying of the photographic film is permitted.

According to the sixth aspect, in the fifth aspect, the drawing-out means includes a first drawing-out means for pressing the intermediate portion to draw-out the intermediate portion to a predetermined position, and a second drawing-out means for further drawing-out the intermediate portion, which has been drawn-out by the first drawing-out means to the predetermined position, so as to press the intermediate portion against the fixed portion.

According to the seventh aspect, in the sixth aspect, the first drawing-out means includes an arm, a first roller rotatably supported by one longitudinal direction end portion of the arm, and second drive means engaged with another end portion of the arm and operated to pivot the arm about the other end portion, and the intermediate portion is pressed by the first roller in accordance with the operation of the second drive means so as to be drawn-out to the predetermined position.

According to the eighth aspect, in the seventh aspect, the second drawing-out means comprises a shaft member, a second roller rotatably supported by one longitudinal direction end portion of the shaft member, third drive means for moving the second roller to a third position at which the shaft member is extended in the longitudinal direction of the shaft member and a fourth position at which the shaft member is withdrawn in the longitudinal direction, and fourth drive means for supporting the third drive means and linearly moving the second roller through the third drive means between the third position and a fifth position at which the intermediate portion is pressed against the fixed portion through the second roller, wherein the shaft member is set in a withdrawn state by the third drive means when the intermediate portion is moved by the first drawing-out means to the predetermined position, and the second roller is moved to the fourth position by the third drive means after the intermediate portion is located at the predetermined position, and the second roller is moved by the fourth drive means from the fourth position to the fifth position with the second roller pressing the intermediate portion against the fixed portion, thereby locating the intermediate portion on the conveying path.

BRIEF DESCRIPTION OF THE DRAWINGS

FIG. 4 is a schematic sectional view showing a negative film carrier and an image sensor section in the scanner according to the embodiment;

FIG. 10 is a flowchart showing photometry and a magnetic recording step in the scanner of the embodiment;

FIG. 11 is a view showing winding directions based on the conveying of the negative film of the embodiment;

DETAILED DESCRIPTION OF PREFERRED EMBODIMENT

Figure 1:
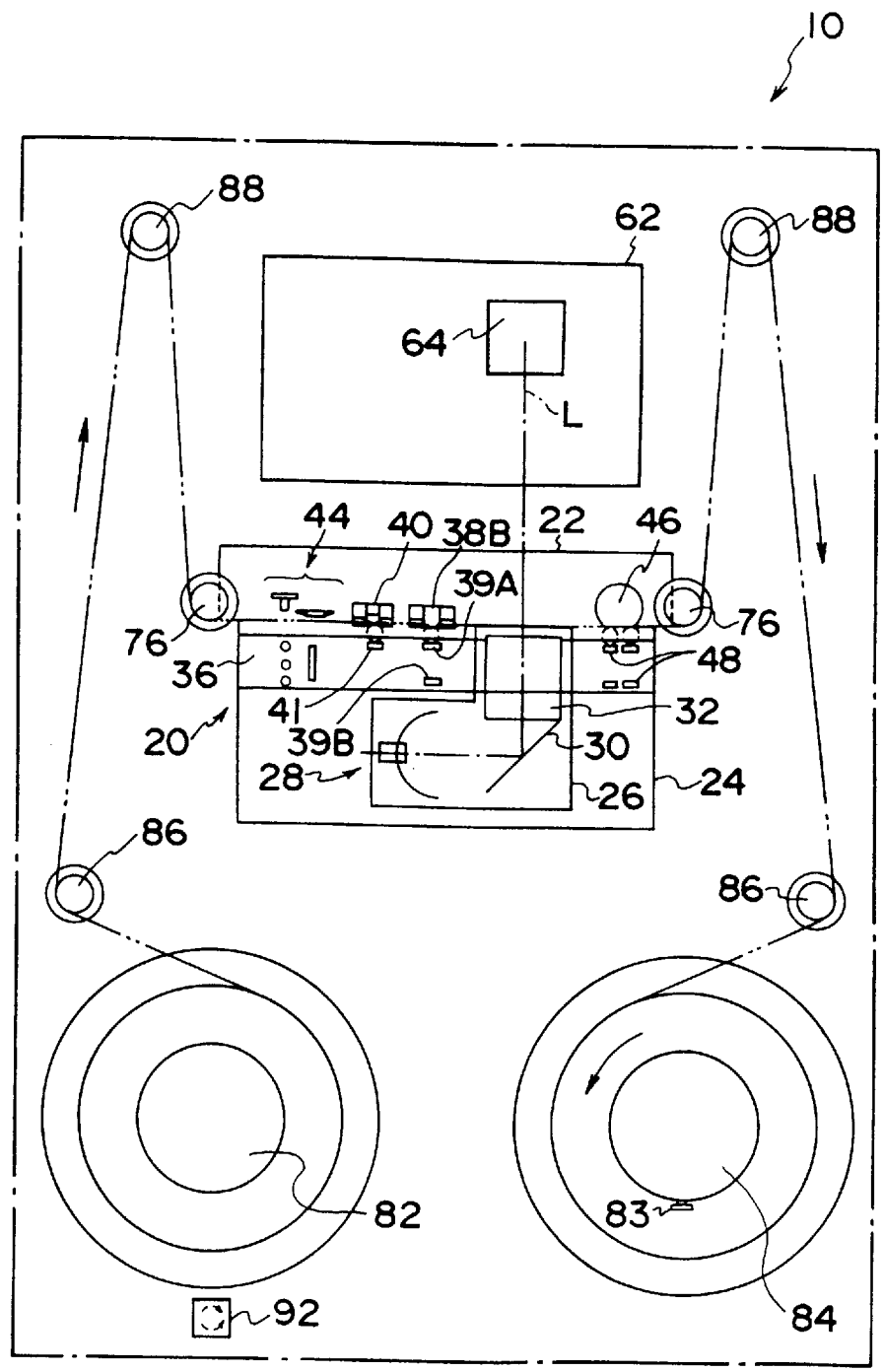
FIG. 1 is a schematic view showing a scanner according to an embodiment of the present invention.

FIG. 1 is a schematic overall view showing a scanner 10 which can be applied to the present invention. The scanner 10 comprises a negative film carrier 20, which can be opened/closed and which is disposed at the center of the scanner 10, a light source 26, which is disposed at a portion of the negative film carrier 20 and which is used only for photometry, and an image sensor section 62 (see FIG. 4), which reads and analyzes image information of each image recorded on a negative film 12. The negative film 12 wound around a core in a layered form is loaded on a supply reel 82 disposed at the lower left in FIG. 1. This negative film 12 is conveyed through a conveying path, and passes through the negative film carrier 20 which can be opened/closed and which is disposed on the conveying path. The negative film 12 is wound on a winding reel 84, which is disposed at the lower right in FIG. 1, such that the leading end of the negative film 12 is clamped by a leader clamp 83 of the winding reel 84.

Figure 2:
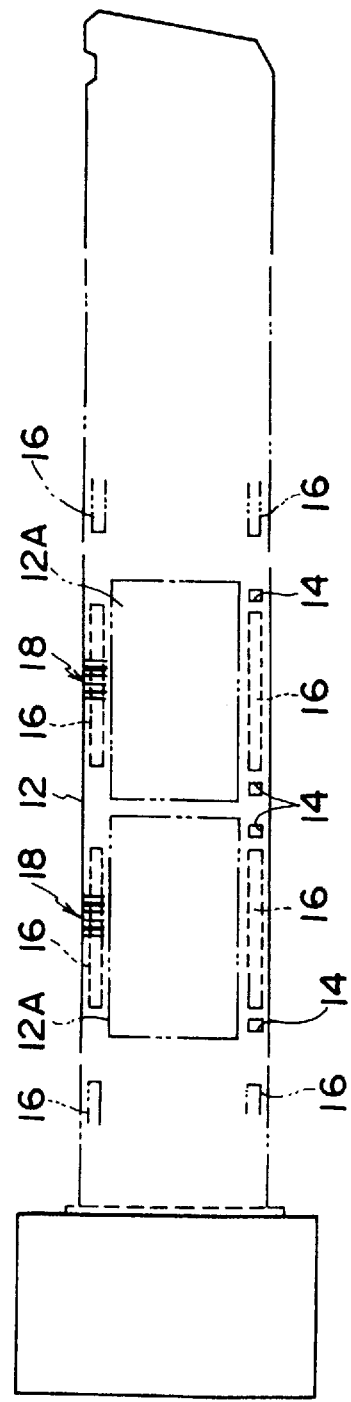
FIG. 2 is a plan view showing a negative film which can be applied to the present invention.

The negative film 12 which can be applied to the scanner 10, as shown in FIG. 2, has a large number of image frames 12A obtained by recording images on the negative film 12 at predetermined intervals along the longitudinal direction. In the negative film 12, two perforations 14 are formed at positions corresponding to each image frame 12A in a predetermined transverse direction end of the negative film 12. Therefore, the front/rear surfaces of the negative film 12 can be discriminated from each other, and the positions of the image frames 12A can be determined.

At a position located between two perforations 14 and adjacent to the image frame 12A, a magnetic track 16 on which magnetic information is recorded is provided.

The magnetic track 16 is formed on the rear surface of the negative film 12 which is the outer side when the negative film 12 is wound in simultaneous printing. Various types of information, such as information obtained when the image recorded on each image frame 12A is photographed, a print size for a printing operation, and an exposure condition, are recorded on the magnetic track 16. Note that information obtained during photographing is recorded by a photographing device such as a camera on the magnetic track 16 formed at an end portion opposing the perforations 14. A bar code 18 representing a DX code is recorded on the end portion opposite the end portion in which the perforations 14 are formed, thereby specifying the negative film 12.

The negative film carrier 20 will be described below.

Figure 3:
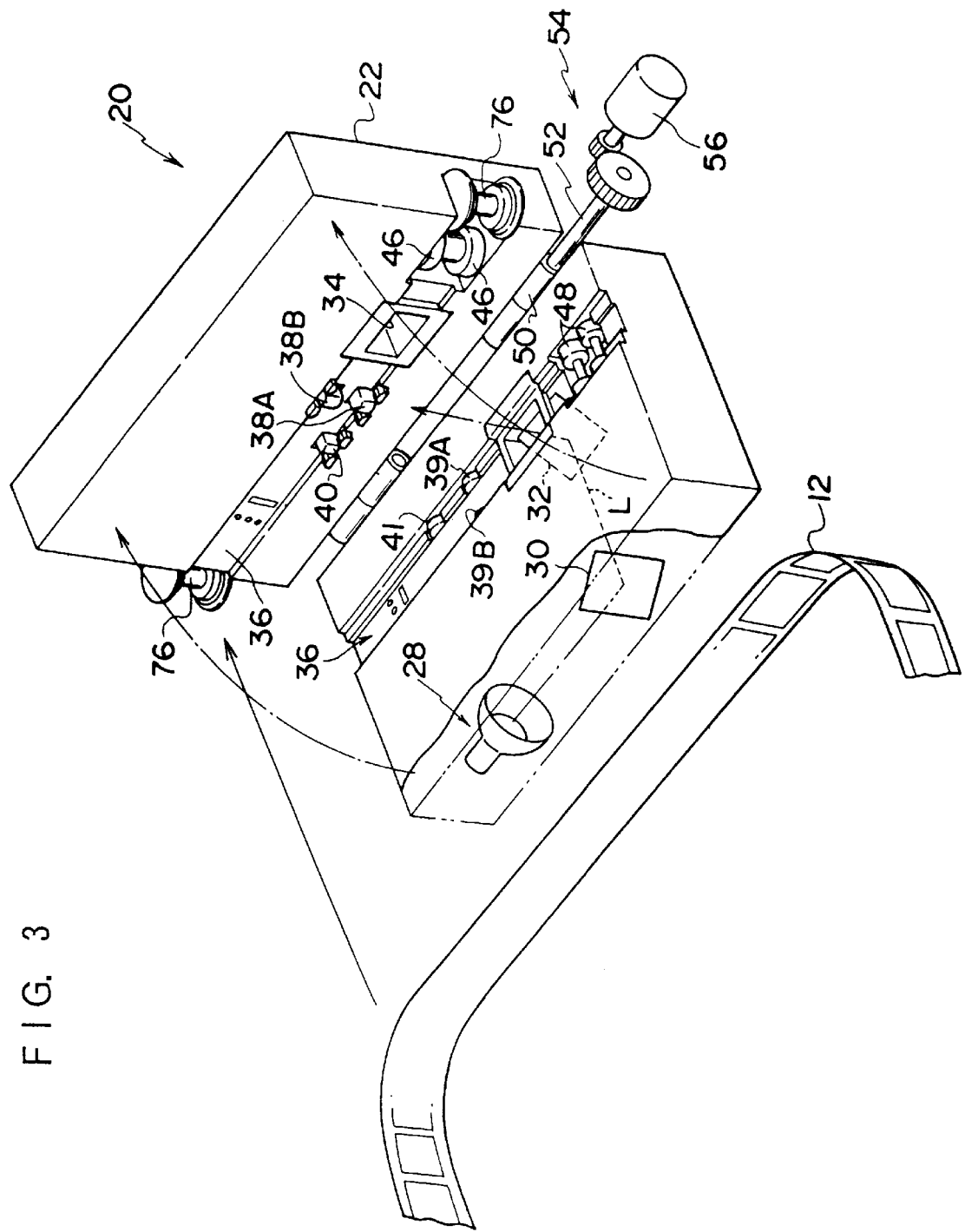
FIG. 3 is a schematic perspective view showing a negative film carrier according to the embodiment.
Figure 6:
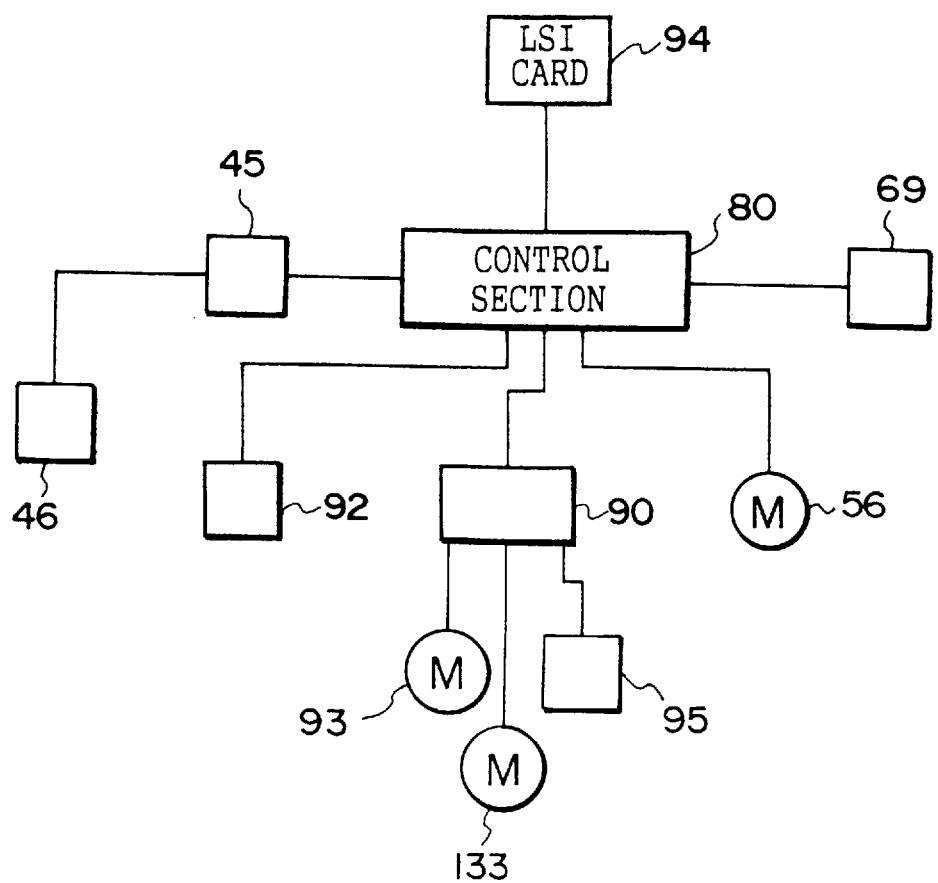
FIG. 6 is a view showing the arrangement of a system relating to loading of the scanner of the embodiment.

As shown in FIG. 3, the negative film carrier 20 which is disposed on the conveying path of the negative film 12 is formed by an upper lid 22 and a lower lid 24. The upper lid 22 has the shape of a substantially rectangular plate, extends from the main body of the scanner 10 to have a substantially horizontal plate surface, and is fixed to the main body. The lower lid 24 has the shape of a substantially rectangular plate like the upper lid 22, and is pivotably connected to the upper lid 22 by a hinge portion 50. This hinge portion 50 is connected to a carrier opening/closing portion 54 via a shaft 52. A motor 56 is arranged in the carrier opening/closing portion 54 to transmit the driving force of the motor 56 to the shaft 52 through a pinion and a gear. The motor 56 is connected to a control section 80 (FIG. 6). Therefore; the motor 56 is driven in accordance with instructions from the control section 80, and the lower lid 24 is pivoted about the hinge portion 50 to a closing position and an opening position with respect to the upper lid 22. In the opening position, the lower lid 24 is stored in a recessed portion (not shown) of the main body of the scanner 10.

As shown in FIG. 3, a light source 28, which is formed by a halogen lamp and a reflector and which is used only for photometry, is disposed inside the lower lid 24 of the negative film carrier 20. A filter portion (not shown) and a light-diffusion cylinder (not shown) are arranged on an optical axis L extending from the light source 28. The filter portion is constituted by cut filters of colors, i.e., C (cyan), M (magenta), and Y (yellow), and an ND filter used for adjusting the light amount. The filters of the filter portion are inserted onto or removed from the optical axis L in accordance with signals from a driver (not shown).

In the upper lid 22 and the lower lid 24 of the negative film carrier 20, when the negative film carrier 20 is closed, as shown in FIGS. 3 and 4, openings 34 are formed at positions (see FIG. 4) where the optical axis L from the light source 26 passes through the upper lid 22 and the lower lid 24 via mirrors 30 and 32 arranged in the lower lid 24. In this manner, exposure light from the light source 28 passes through the image frame 12A of the negative film 12 positioned at the openings 34 of the negative film carrier 20. Conveying paths 36, which oppose each other across the negative film 12 in the closed state of the negative film carrier 20, are formed in the upper lid 22 and the lower lid 24 of the negative film carrier 20. The width of the conveying path 36 is designed to match the width of the negative film 12.

Figure 5A:
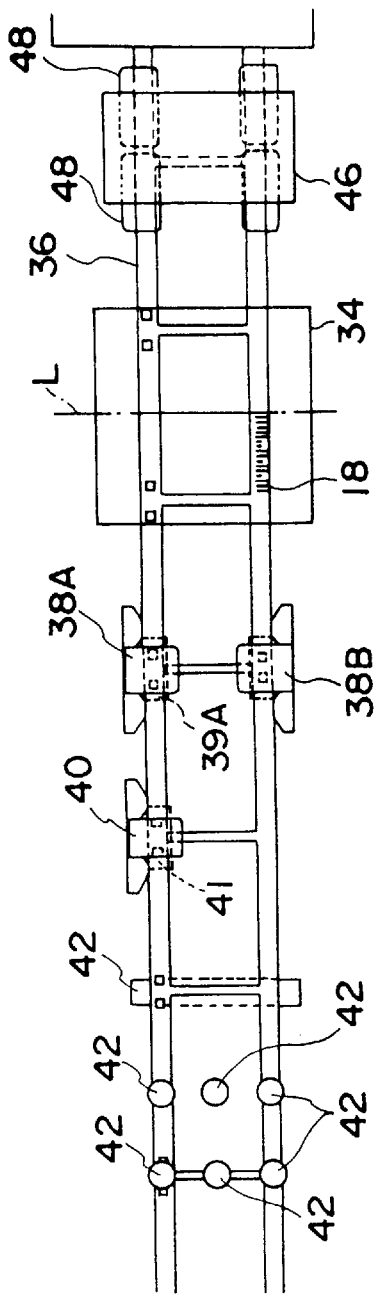
FIG. 5A is a schematic view showing a portion around a conveying path in the negative carrier of the embodiment.
Figure 5B:
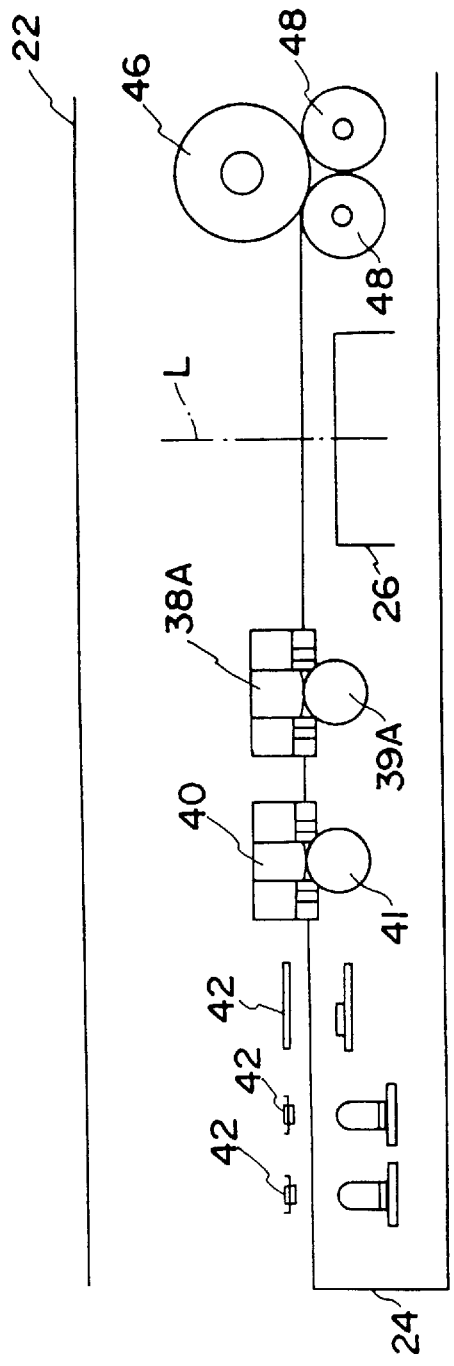
FIG. 5B is a sectional view showing the conveying path illustrated in FIG. 5A.

As shown in FIGS. 5A and 5B, in the upper lid 22 of the negative film carrier 20, the transverse direction end portions of the conveying path 36 on the upstream side of the opening 34 in the conveying direction of the negative film 12 have a pair of reading heads 38A and 38B. The reading heads 38A and 38B are designed to hold the negative film 12 with opposing rollers 39A and 39B when the negative film 12 is disposed on the conveying path 36 in the closed state of the negative film carrier 20. The reading heads 38A and 38B are brought into slidable contact with the magnetic tracks 16 (see FIG. 2) formed on both transverse direction sides of the negative film 12 so as to read the magnetic information recorded on the magnetic tracks 16.

The reading heads 38A and 38B are arranged to be located between adjacent image frames 12A when an image frame 12A is positioned at the opening 34 for photometry. In this manner, when the negative film 12 is intermittently conveyed from the supply reel 82 to the winding reel 84 to perform a photometric operation on the image frames 12A (first-half (feeding) conveying), the magnetic information of the one image frame which has just been subjected to the photometric operation can be read by conveying the negative film 12 by one image frame. The reading heads 38A and 38B are connected to an information processing section 69, and the magnetic information read by the reading heads 38A and 38B is sent to the information processing section 69 (see FIG. 4) to be processed.

A recording head 40 is disposed on the conveying path 36 of the negative film carrier 20 at the upstream side in the negative film conveying (feeding) direction. Like the reading heads 38A and 38B, the recording head 40 is arranged to be located between adjacent image frames 12A when another image frame 12A is positioned at the opening 34. The recording head 40 is disposed at the end portion of the conveying path 36 on the same side as that of the recording head 38A, and the recording head 40 is connected to the information processing section 69.

When the negative film 12 is conveyed at a constant speed from the winding reel 84 to the supply reel 82 (second-half (returning) conveying), the recording head 40 and a roller 41 opposing the recording head 40 nip and hold the negative film 12. The recording head 40 is brought into slidable contact with the magnetic tracks 16 of the negative film 12 to record on the magnetic tracks 16 exposure correction data obtained by photometry from the information processing section 69. In this manner, the exposure correction data obtained by photometry on the first-half (feeding) conveying path is recorded on the magnetic tracks 16 by the recording head 40. When prints are being formed for a reorder, the recorded data is read from the magnetic tracks 16 by the recording head 38A disposed on the same side. Therefore, the data can be reused.

In the negative film carrier 20, an optical sensor section 44 formed by a plurality of sensors 42 is disposed on the conveying path 36 at the upstream side of the reading heads 38A and 38B in the negative film conveying (feeding) direction. The optical sensor section 44 is connected to the information processing section 69. Therefore, a spliced portion of the negative film 12 is detected by the optical sensor section 44 to cause the information processing section 69 to specify one roll of negative film, and the perforations 14 formed in the negative film 12 are detected by the optical sensor section 44 to cause the information processing section 69 to specify each image frame 12A. In addition, the information processing section 69 is connected to the control section 80. The control section 80 is connected to a conveying roller 46 (to be described later) via a drive section 45. The conveying roller 46 is controlled through the drive section 45 such that the control section 80 can accurately position each image frame 12A at the opening 34 on the basis of the information from the information processing section 69.

Other sensors 42 detect the bar code 18 on the negative film 12 to cause the information processing section 69 to specify the negative film 12, and measure the image density of the recorded image frame 12A, and detect the size of the image frame 12A and the first image frame 12A and the last image frame 12A. Still other sensors 42 cause the information processing section 69 to check whether an image is recorded on the image frame 12A. These sensors 42 are arranged to the left and the right symmetrically such that each optical information can be detected regardless of the direction of the negative film 12. Still other sensors can detect the presence/absence of an image on the image frame 12A. In this manner, a frame having no image can be detected.

In the upper lid 22 of the negative film carrier 20, the conveying roller 46, which is disposed on the conveying path 36 at the downstream side of the openings 34 in the conveying direction of the negative film 12, holds and conveys the negative film 12 with a pair of opposing press rollers 48 which are provided at the lower lid 24.

As described above, the conveying roller 46 intermittently conveys the negative film 12 such that the respective image frames 12A can successively be positioned at the openings 34 by the control section 80 through the drive section 45 while the negative film is being conveyed during the first-half (feeding) conveying. The conveying roller 46 conveys the elongate rolled negative film 12 (comprising a plurality of rolls of negative film joined in series) at a constant speed during the second-half (returning) conveying.

In this manner, in simultaneous printing, when the negative film 12 is supplied to the negative film carrier 20, the negative film 12 is intermittently conveyed by the conveying roller 46 during first-half (feeding) conveying, various types of optical information are read by the optical sensor section 44 with respect to the image frames 12A, and the magnetic information is read by the reading heads 38A and 38B. The elongate rolled negative film 12 is intermittently conveyed to position the image frames 12A at the openings 34, and photometry using light rays from the light source 26 is carried out for the image of the positioned image frame 12A. On the other hand, during the second-half (returning) conveying, the elongate rolled negative film 12 recovered by the winding reel 84 is conveyed at a constant rate on the conveying path 36, and is brought into slidable contact with the recording head 40, thereby recording information obtained by photometry on the magnetic tracks 16.

As shown in FIG. 4, an image sensor section 62 formed by a light-receiving section 58, which extends from the main body of the scanner 10, and by a sensor section 60, which is built in the main body of the scanner 10, is disposed adjacent to the negative film carrier 20. The light-receiving section 58 includes a mirror 64 to guide the optical axis L from the light source 28 to the sensor section 60 disposed adjacent to the light-receiving section 58.

An exposure detection sensor 66 is disposed at the furthest, downstream side of the optical axis L guided by the sensor section 60 via the mirror 64 of the light-receiving section 58. The exposure detection sensor 66 is formed by a CCD element which is formed by pixels arranged in a matrix of 256×256. The exposure detection sensor 66 is connected to an exposure calculation section 68, and data of an image picked up by the CCD element is calculated by the exposure calculation section 68. The calculated exposure is to be input to the information processing section 69 connected to the exposure calculation section 68. The exposure detection sensor 66 has a filter (not shown) on the light source 28 side.

The characteristics of the filter are matched with the characteristics of the negative film 12 and a paper for printing.

A prism 70 is arranged between the mirror 64 and the exposure detection sensor 66. The prism 70 is designed to cause a transmitted image of the negative film 12 to pass therethrough and to be reflected thereby. The reflected transmitted image reaches a video sensor 72. The video sensor 72 is formed by a CCD sensor having 640×640 pixels and picks up an image on the negative film 12. The video sensor 72 is connected to a monitor 75 through an image processing section 74, and the image picked up by the CCD element is displayed on the monitor 75. A keyboard 77 is connected to the image processing section 74. When a correction value is input from the keyboard 77, the image displayed on the monitor 75 can be corrected. The image processing section 74 is connected to the information processing section 69, and the corrected image information is input to the information processing section 69.

As shown in FIG. 3, a pair of guide rollers 76 are provided at the upper lid 22 of the negative film carrier 20. The negative film 12 conveyed through the conveying path is guided by the guide rollers 76 in the negative film carrier 20.

Figure 13:
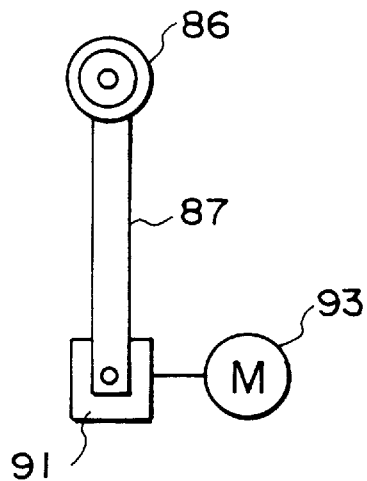
FIG. 13 is a schematic front view showing a portion for driving drawing-out rollers.

As shown in FIG. 1, a pair of movable drawing-out rollers 86 are arranged between the supply reel 82 and the winding reel 84. As shown in FIG. 13, each drawing-out roller 86 is rotatably supported at one longitudinal direction end portion of an arm 87. The other longitudinal direction end portion of the arm 87 is connected to a gear device 91. The gear device 91 is driven by a motor 93 which is driven in a forward/reverse direction to swing the arm 87 in a clockwise direction and a counterclockwise direction (i.e., out from the drawing-out and toward the deep back of the drawing-out in the direction orthogonal to the surface of the paper on which FIG. 13 has been drawn-out). A movement path P (see FIG. 7) of each drawing-out roller 86 corresponds to the swinging radius of the drawing-out roller 86, and traverses the negative film 12 wound between the supply reel 82 and the winding reel 84. In this manner, when the drawing-out rollers 86 move along the movement paths P, the negative film 12 is pressed out toward the negative film carrier 20 (see FIG. 7).

Figure 14:
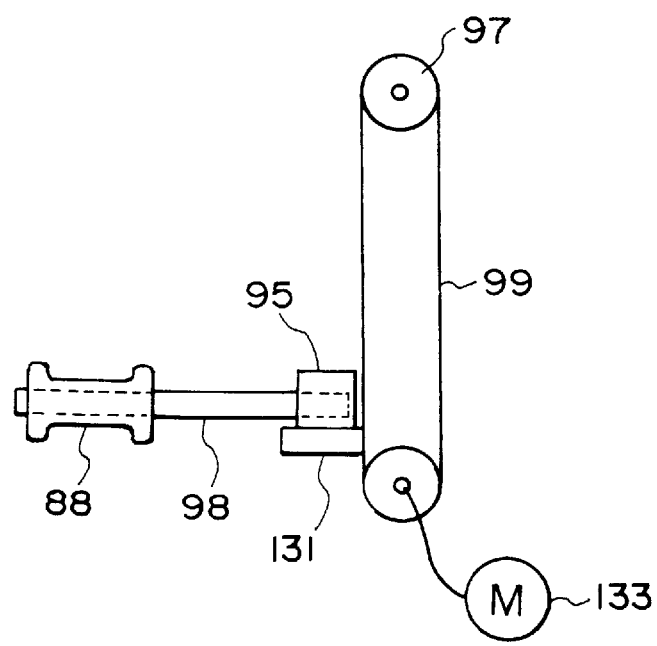
FIG. 14 is a schematic side view showing a portion for driving reserver rollers.

A pair of reserver rollers 88, which are in the main body of the scanner 10 and project from the scanner 10 and move along a predetermined movement paths M (see FIG. 7), are disposed on the conveying path of the negative film 12. The reserver rollers 88 move up and down so that the tension applied to the negative film 12 when the negative film 12 is being conveyed and is stopped does not exceed a predetermined level; so that excessive tension does not act on the negative film 12. The above arrangement will be described in more detail below with reference to FIG. 14. Each reserver roller 88 is rotatably supported by one longitudinal direction end portion of a shaft member 98. The other longitudinal direction end portion of the shaft member 98 is connected to a solenoid drive device 95. Therefore, the reserver rollers 88 project from the main body of the scanner 10 by the solenoid drive device 95. The solenoid drive device 95 is supported by a base 131 supported by a belt 99 wound on pulleys 97. One of the pulleys 97 is connected to a motor 133 which is driven forward/backward. Therefore, when the motor 133 is driven forward/backward, the reserver rollers 88 are linearly moved upward/downward. The movement path of each reserver roller 88 is formed to traverse the negative film which is spanned between the pair of drawing-out rollers 86. In this manner, when the reserver roller 88 moves along the movement path M, the negative film 12 is pressed out (see FIG. 7).

The motor 93 is connected to a loading control section 90, and the solenoid drive device 95 and the motor 133 are connected to the loading control section 90 (see FIG. 6). As will be described later, the drawing-out rollers 86 and the reserver rollers 88 move along their predetermined movement paths in accordance with instructions from the loading control section 90.

As shown in FIG. 1, a display panel 92 is provided near the supply reel 82 and indicates the loading direction of the negative film 12 loaded on the supply reel 82 side. The display panel 92 is connected to the control section 80 (see FIG. 6), and information written in an LSI card 94 is input to the control section 80. In this manner, the loading direction of the negative film 12 can be indicated on the display panel 92 on the basis of the information written in the LSI card 94.

Loading operation of the negative film 12 will be described below with reference to FIGS. 7 and 8.

"Loading operation" of the negative film 12 refers to operations from a state wherein the leading end portion of the negative film 12 wound on the supply reel 82 is clamped by the leader clamp 83 of the winding reel 84, to a state wherein the negative film 12 is held between the upper lid 22 and the lower lid 24 of the negative film carrier 20 so that photometry of the images on the negative film 12 is possible.

Figure 7:
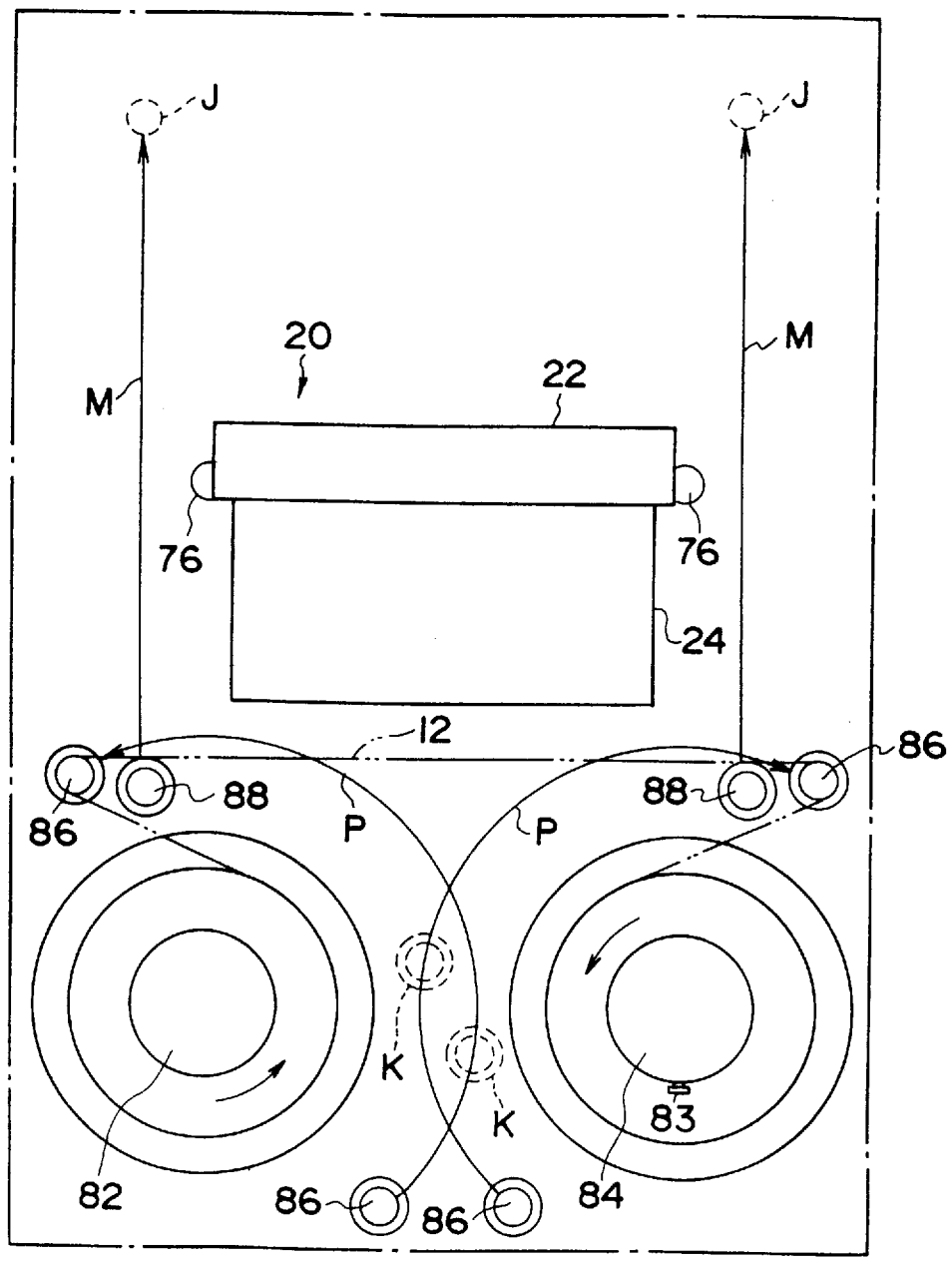
FIG. 7 is a view for explaining an open state of the negative film carrier relating to loading of the scanner of the embodiment.
Figure 8:
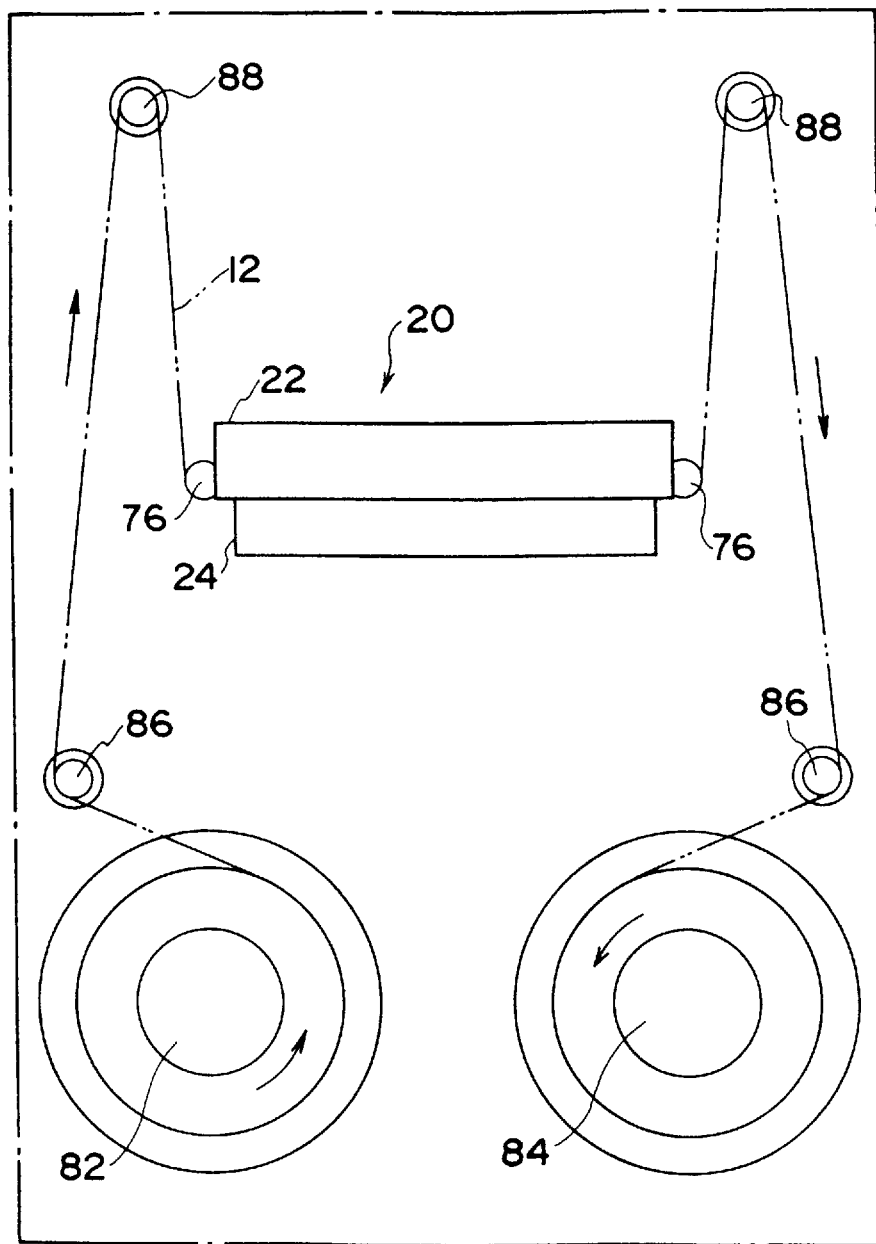
FIG. 8 is a view for explaining a closed state of the negative film carrier relating to loading of the scanner of the embodiment.

As shown in FIG. 7, before the negative film 12 is loaded, the lower lid 24 of the negative film carrier 20 is set in an open state, and the conveying path 36 on the upper lid 22 side is exposed to the supply reel 82 (the inside structure of the negative film carrier 20 is omitted in FIGS. 7 and 8).

The negative film 12 is wound or spanned between the supply reel 82 and the winding reel 84. In this case, the two drawing-out rollers 86 arranged outside the negative film 12 pass from initial positions to drawing-out intermediate positions (K positions) in accordance with instructions from the loading control section 90, and move along the movement paths P to drawing-out stop positions. The negative film 12 spanned between the reels is thereby drawn-out by the drawing-out rollers 86 toward the negative film carrier 20 without being twisted, and is disposed between the supply reel 82 and the winding reel 84 and the negative film carrier (negative film drawing-out). In this case, the surface of the negative film 12 on which the magnetic tracks 16 are formed faces the conveying path 36 of the negative film carrier 20 on the upper lid 22 side such that the magnetic tracks 16 of the negative film 12 are brought into contact with the reading heads 38A and 38B and the recording head 40.

The negative film 12 spanned between the two drawing-out rollers 86 passes through the stored positions of the reserver rollers 88 in the step of drawing-out the negative film. In this manner, upon completion of the drawing-out of the negative film by the drawing-out rollers 86, the reserver rollers 88 are located between both the reels 82, 84 and a portion of the negative film 12 extended between the drawing-out rollers 86.

After the portion of the negative film 12 has passed by the stored positions of the reserver rollers 88, the solenoid drive device 95 is driven in accordance with instructions from the loading control section 90 to cause the reserver rollers 88 to project on the surface of the scanner 10. The motor 133 is driven to move the reserver rollers 88 along their movement paths M. Therefore, the negative film 12 extended between the drawing-out rollers 86 is pressed upward in FIG. 7 by the reserver rollers 88 without being twisted while the surface of the negative film 12 on which the magnetic tracks 16 are formed faces the conveying path 36 on the upper lid 22 of the negative film carrier 20.

The portion of the negative film 12 pressed by the reserver rollers 88 is located on the conveying path 36 of the negative film carrier 20 before the reserver rollers 88 are stopped at stop positions J. After the negative film 12 is located on the conveying path 36 (upper lid side) of the negative film carrier 20, the reserver rollers 88 move along the movement paths M to the stop positions J. The reserver rollers 88 move along the movement paths M such that excessive tension does not act on the negative film 12.

After the negative film 12 has been located on the conveying path 36 on the upper lid 22 side of the negative film carrier 20, the motor 56 is driven in accordance with an instruction from the control section 80, the lower lid 24 moves toward the upper lid 22, and the negative film carrier 20 is set in a closed state (see FIG. 8). In this manner, the negative film 12 is set in the negative film carrier 20, the loading operation of the negative film 12 is completed, and the conveying of the negative film 12 is guided in the negative film carrier 20, so that photometry for each image of the negative film 12 begins.

Therefore, after the negative film 12 spanned between the supply reel 82 and the winding reel 84 is pushed by the drawing-out rollers 86 without being twisted, the surface of the negative film 12 on which the magnetic tracks 16 are formed faces the conveying path 36 on the upper lid 22 of the negative film carrier 20. In this state, until the negative film 12 is located on the conveying path 36 of the upper lid 22 of the negative film carrier 20 which is disposed at the center of the scanner 10 and set in an open state, the negative film 12 is pressed further by the reserver rollers 88. When the negative film 12 is located on the conveying path 36, the negative film carrier 20 moves (swings) the lower lid 24 to close the negative film carrier 20, thereby completing the loading operation of the negative film 12. Therefore, the negative film 12 is designed to be set in the negative film carrier 20 by only an operation in which the leading end of the negative film 12 is drawn-out from the winding reel 84 and clamped by the leader clamp 83.

Figure 9A:
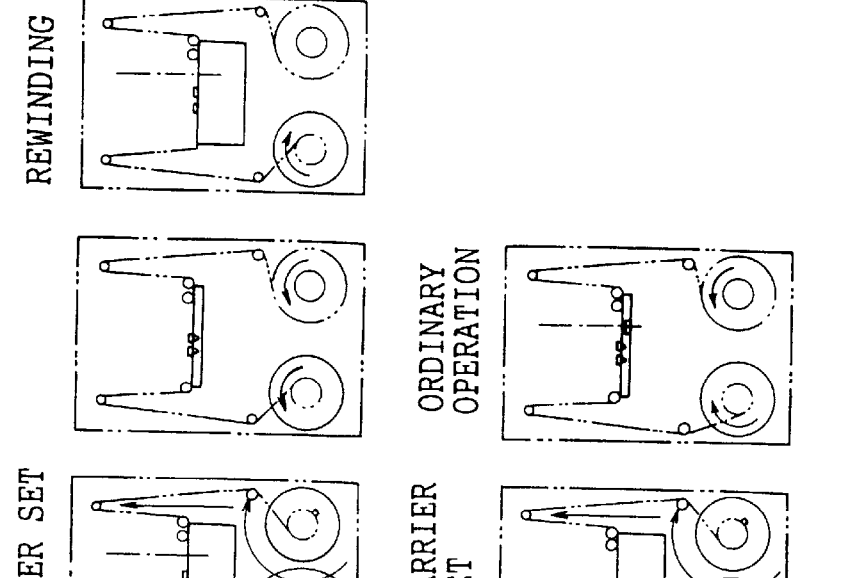
FIG. 9A is a view showing loading and conveying of the negative film at the time of simultaneous printing.

Operation of the present embodiment will be described below with reference to FIG. 9A. In FIG. 9A, the negative film carrier 20 is illustrated schematically.

The lower lid 24 of the negative film carrier 20 is moved to set the negative film carrier 20 in an open state, and the LSI card 94 is inserted into a predetermined insertion opening. The directions of the elongate rolled negative film 12 (i.e., a plurality of rolls of negative films which are connected in the form of a roll) to be loaded is displayed on the display panel 92 in accordance with information written in the LSI card 94.

Information regarding the winding manner before the loading operation of the negative film 12 and information regarding the winding manner after processing of the negative film 12 are written in the LSI card 94. The control section 80 recognizes this information and sets a loading direction and a winding direction. The loading direction and winding direction are displayed on the display panel 92 by an arrow or the like.

The negative film 12, which has been subjected to a developing process and rolled, is loaded on the supply reel 82 in accordance with the directions shown on the display panel 92, and the leader portion of the negative film 12 is drawn-out and clamped by the leader clamp 83 of the winding reel 84, thereby spanning the negative film 12 between the supply reel 82 and the winding reel 84 (see "negative film winding" in FIG. 9A).

Upon completion of the spanning of the negative film 12 between the reels, the drawing-out rollers 86 move along the movement paths P (see FIG. 7) to push the negative film 12 out and to draw the negative film 12 out from the supply reel 82 (see "negative film drawing-out" in FIG. 9A).

Upon completion of the drawing-out of the negative film 12 by the drawing-out rollers 86, the reserver rollers 88 project from the stored positions, and begin to move along the movement paths M (see FIG. 7).

The negative film 12 is pressed out further due to the movement of the reserver rollers 88, and moves toward the conveying path 36 on the upper lid 22 side of the negative film carrier 20 disposed at the center of the scanner 10. Before the reserver rollers 88 reach the stop positions J (see FIG. 7), the negative film 12 is brought into contact with the conveying path 36 (see "carrier set" in FIG. 9A).

When the negative film 12 is brought into contact with the conveying path 36, the lower lid 24 of the negative film carrier 20 moves toward the upper lid 22 to set the negative film carrier 20 in a closed state, and setting of the negative film 12 is completed. The reserver rollers 88 are stopped at predetermined positions, thereby completing the loading of the negative film 12.

Reading of the magnetic information recorded on the magnetic tracks 16 and photometry for each image are performed on the negative film 12 for which loading has been completed (see "ordinary operation" in FIG. 9A).

This operation will be described below with reference to FIG. 10.

When the elongate rolled developed negative film 12 is set on the supply reel 82 disposed at one end of the scanner 10, and the leader portion of the negative film 12 is drawn out and clamped by the leader clamp 83, the above loading operation is performed in step 100.

Upon completion of the loading operation, when the perforations 14 indicating the position of an image frame 12A a redetected by the optical sensor section 44, intermittent conveying is performed by the conveying roller 46 in step 102. In step 104, reading of magnetic information recorded on the magnetic tracks 16 corresponding to the image frame 12A is instructed.

When reading of the magnetic information is performed, in step 106, the image frame 12A whose magnetic information is read is positioned at the openings 34 of the negative film carrier 20, and photometry is carried out. Photometry is performed by a transmitted image of an image on the image frame 12A obtained by the light source 28 being input to the exposure calculation section 68 through the exposure detection sensor 66 and to the image processing section 74 through the video sensor 72. An exposure correction value is calculated in the exposure calculation section 68 so that proper exposure may be carried out.

Upon completion of photometry for one image frame 12A, it is judged in step 108 whether photometry for the image frames 12A of a negative film 12 of one roll has been finished. When photometric operations for the image frames 12A of one roll of negative film 12 have not yet been finished, the answer to the determination in step 108 is "No", and the routine returns to step 106 to perform photometry for the next image of the one roll.

Upon completion of photometry for the image frames 12A of the negative film 12 of the one roll, in step 110, exposure correction values are determined on the basis of the read magnetic information and the results of the photometric operations.

When the exposure correction values for images of the negative film 12 of the one roll have been determined, it is judged in step 112 whether photometry for the last image frame 12A of the elongate rolled negative film 12 loaded on the supply reel 82 has been completed. If photometric operations for the elongate rolled negative film 12 have not been completed, the routine returns to step 106. A photometric operation for each image frame 12A and calculation of the exposure correction value for each image on a negative film of one roll are repeated until the photometric operations for the elongate rolled negative film 12 are completed.

When the photometric operations for the elongate rolled negative film 12 are completed, the answer to the determination in step 112 is "Yes", and the routine proceeds to step 114. In step 114, the last image frame 12A of the elongate rolled negative film 12 is conveyed along the conveying path 36 of the negative film carrier 20 to a recordable position where the recording head 40 can be brought into slidable contact with the magnetic tracks 16 of the last image frame 12A.

Upon completion of the conveying of the last image frame 12A to the recordable position, it is judged in step 116 whether preparations for recording an exposure correction value of each frame of the rolled negative film including the last image frame 12A have been completed. The exposure correction amount for the last image frame 12A must be recorded immediately after the photometric operation. Therefore, by the time that the last image frame 12A of the negative film 12 whose recording is executed first is positioned at the recordable position, the exposure correction value of each image on the rolled negative film 12 must be determined. Therefore, unless the correction amount for each image of the film 12 is determined, the answer to the determination in step 116 is "No".

Upon completion of the conveying of the negative film 12 to the recordable position and determination of the exposure correction values, the answer to the determination in step 116 is affirmative. In this case, when reversing of the conveying direction is instructed in step 118, and constant-speed conveying serving as the second-half (returning) conveying is instructed in step 120, the negative film 12 is conveyed at a constant speed on the conveying path 36 of the negative film carrier 20 (see "rewinding" in FIG. 9A).

When the constant-speed conveying is started, in step 122, the recording head 40 is instructed to magnetically record an exposure correction value corresponding to each image frame 12A.

When magnetic recording of the exposure correction value corresponding to each image frame 12A is instructed and recording is carried out on the corresponding magnetic tracks 16, it is judged in step 124 whether the corresponding exposure correction value is recorded with respect to the last image frame 12A of the rolled negative film 12. If magnetic recording for the last image frame 12A has not been completed, the answer to the determination in step 124 is "No", and the routine returns to step 122 where recording of magnetic information for each image frame 12A is repeated.

Upon completion of magnetic recording of the exposure correction amount for the last image frame 12A, it is checked in step 126 whether the rolled negative film 12 has been entirely recovered by the supply reel 82. If the rolled negative film 12 is entirely recovered by the supply reel 82, the answer to the determination in step 126 is affirmative, and the series of processes are finished (see "end" in FIG. 9A).

In this case, the negative film 12, which has been subjected to processing and which is in a rolled state, is maintained in the same winding state (winding direction and rear/front surfaces) as that when the negative film 12 was wound on the supply reel 82 before the processing, and the processing can be finished.

In this manner, the negative film 12 can be easily loaded on the scanner 10, and the negative film 12 is loaded while the negative film carrier 20 is set in an open state. For this reason, the negative film 12 can be set without damaging the leader portion (leading end portion) thereof.

Therefore, the negative film 12 can be easily and reliably loaded on the scanner 10.

The loading of the negative film 12 for a reorder (i.e., for the forming of prints for a reorder) will be described below with reference to FIG. 9B.

In processing for preparing prints which have been reordered, the negative film 12 is prepared by joining a plurality of rolls of negative films together and is placed at the scanner 10. More specifically, the negative film 12 is placed at the scanner 10 without being subjected to the developing process. For this reason, the negative film 12 is wound, or rolled, such that the emulsion surface faces inward, and the last image frame 12A in the negative film 12 serves as the first image frame.

For this reason, the negative film 12 is loaded on the supply reel 82 such that the surface on which the magnetic tracks 16 are formed can be brought into slidable contact with the reading heads 38A and 38B and the recording head 40. The leading end portion of the negative film 12 is clamped by the leader clamp 83 (see "negative film winding" in FIG. 9B).

Figure 9B:
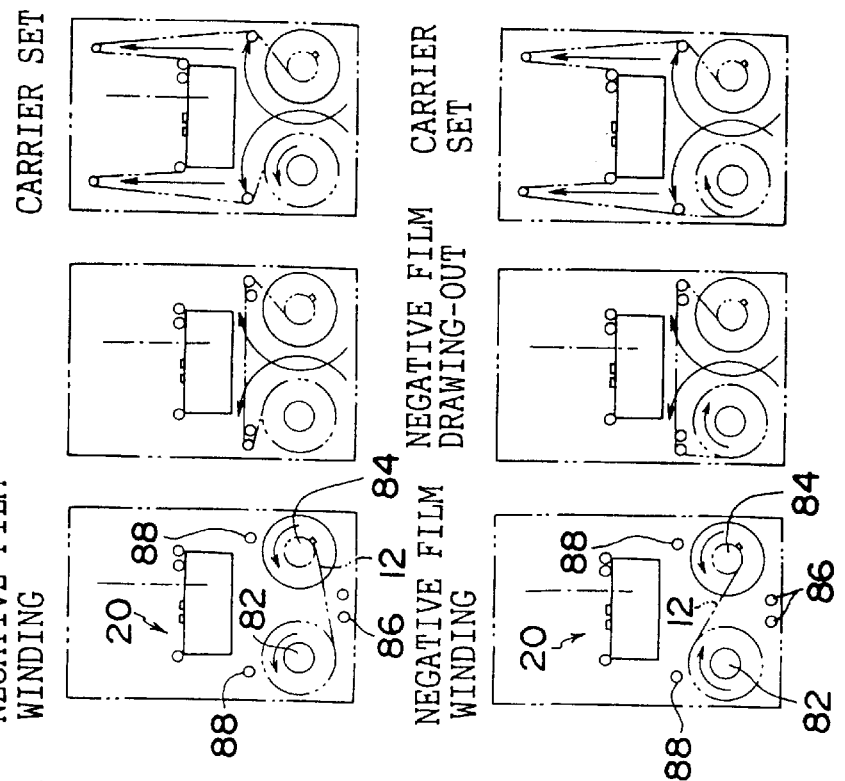
FIG. 9B is a view showing loading and conveying of the negative film at the time of printing for a reorder.

After the negative film 12 is spanned between the reels, the drawing-out rollers 86 move along the movement paths P as in a simultaneous printing operation, and the negative film 12 is drawn-out (see "negative film drawing-out" in FIG. 9B). The reserver rollers 88 move along the movement paths M to press the negative film 12 out, and the negative film 12 is brought into contact with the conveying path 36 on the upper lid 22 side of the negative film carrier 20 (see "carrier set" in FIG. 9B).

When the negative film carrier 20 is set in a closed state, and the negative film 12 is set on the conveying path 36, loading is completed. The same first-half (feeding) conveying as described above is performed, and photometry for the images recorded on the image frames 12A of the negative film 12 is performed (see "ordinary operation" in FIG. 9B).

At this time, photometry for the negative film 12 is performed beginning from the last image frame 12A of the negative film 12, and the emulsion surface of the negative film 12 faces inward.

When a photometric operation is performed for each image of the negative film 12, the portion of the negative film 12 for which photometric operations have been completed is wound on the winding reel 84 (see "ordinary operation" in FIG. 9B). Only photometric operations are performed in a reorder, and information such as exposure correction values is not rewritten in the magnetic tracks 16. The negative film 12 is entirely wound on the winding reel 84 (see "end" in FIG. 9B).

When processing is completed by winding the entire negative film 12 on the winding reel 84, the negative film 12 is wound on the winding reel 84 such that the emulsion surface faces outward and the first frame of the last negative film 12 serves as the drawing-out leader.

More specifically, the negative film 12 for reorder, whose emulsion surface faces inward and whose last frame serves as the drawing-out leader, is loaded on the supply reel 82 such that the surface on which the magnetic tracks 16 are formed opposes the conveying path 36 on the upper lid 22. Drawing-out by the drawing-out rollers 86 and pressing by the reserver rollers 88 are performed, thereby setting the negative film 12 in the negative film carrier 20 which is set in an open state. Thereafter, the negative film carrier 20 is set in a closed state, and photometry for the negative film 12 is carried out while the negative film 12 is intermittently conveyed. After photometric operations for all of the image frames 12A of the negative film 12 have been completed, the negative film 12 wound on the winding reel 84 is unloaded. At this time, the emulsion surface of the negative film 12 faces outward, and the starting frame of the negative film 12 serves as the drawing-out leader.

In this manner, the winding manner of the rolled negative film 12 can be changed while the negative film 12 is loaded on the scanner 10 and subjected to photometric processing. Therefore, a step of rewinding need not be added, and photometric processing can be rapidly performed in a desired winding manner.

FIG. 11 is a view showing a change in winding manner of the negative film depending on the loading direction of the negative film 12 on the supply reel 82 and the winding reel 84.

As shown in FIG. 11, when the negative film 12 is set at the supply reel 82 and the winding reel 84 such that the drawing-out side and winding side of the negative film 12 are in the same direction, the negative film 12 can be wound on the winding reel 84 without changing the direction of the emulsion surface, i.e., the front/rear surfaces of the negative film 12 (see 1 and 4 in FIG. 11). On the other hand, when the negative film 12 is set such that the negative film 12 crosses over between the supply reel 82 and the winding reel 84, the negative film 12 can be wound on the winding reel 84 such that the front/rear surfaces of the negative film 12 are changed (see 2 and 3 in FIG. 11).

Therefore, the directions of the front/rear surfaces of the negative film 12 can be easily changed to the desired directions. In addition, when the process of changing the direction of the front/rear surfaces is incorporated into one of the processing steps, the directions of the front/rear surfaces can be set to the desired directions without a deterioration in the throughput, or processability, of the photographic film.

In the present embodiment, the negative film 12 is set in the negative film carrier 20 by moving the reserver rollers 88. However, the present invention is not limited to this embodiment.

Figure 12:
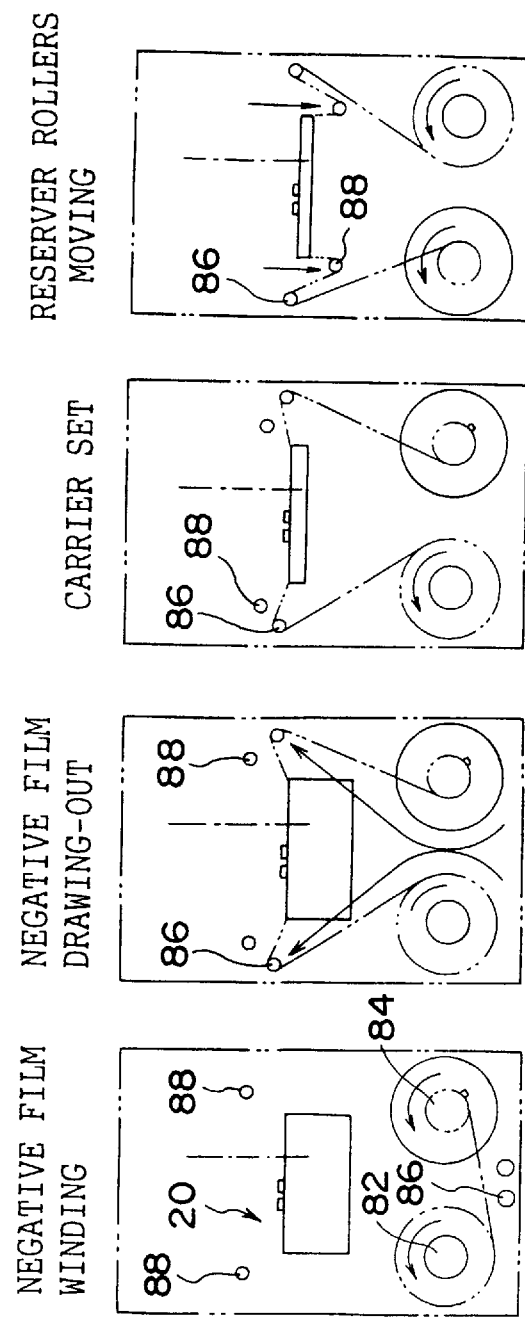
FIG. 12 is a view showing another example of loading of the scanner of the embodiment.

FIG. 12 shows another method of loading the negative film 12 onto the negative film carrier 20. In this case, the negative film 12 is placed on the conveying path 36 on the upper lid 22 side of the negative film carrier 20 by the drawing-out rollers 86. Thereafter, the reserver rollers 88 move to form a reserver. In accordance with this structure, the same effects as those described above can be obtained.

Referring to FIG. 12, the reserver rollers 88 are located above the negative film carrier 20 when the negative film 12 is set at the supply reel 82 in FIG. 12 (see "negative film winding" in FIG. 12). In this case, the drawing-out rollers 86 move along movement paths directed toward the sides of the negative film carrier 20 to place the negative film 12 on the conveying path 36 on the upper lid 22 side of the negative film carrier 20 (see "negative film drawing-out" in FIG. 12). The lower lid 24 of the negative film carrier 20 moves after the negative film 12 has been placed, so as to set the negative film carrier 20 in a closed state (see "carrier set" in FIG. 12). When the negative film carrier 20 is set in the closed state, the reserver rollers 88 move to form a reserver.

In the present embodiment, the lower lid 24 having the light source 28 moves to open and close. However, when the light source 28 is disposed at the upper lid 22 fixed to the scanner 10, the same effect can be obtained.

In the present embodiment, jamming is prevented by the negative film carrier 20 which can be opened/closed and which is provided in the scanner 10, and the negative film 12 is reliably loaded and conveyed. However, the present invention is not limited to the scanner 10. A carrier can be opened/closed in another apparatus such as a printer to reliably convey the negative film 12, so that the same effect can be obtained.

What is claimed is:

1. A photographic film loading method of loading a photographic film on an apparatus which effects photometry of a frame image on the photographic film, comprising the steps of:

determining a loading direction and a winding direction of the photographic film on the basis of a winding manner of the photographic film before the photographic film is loaded on said apparatus; and loading the photographic film on said apparatus on the basis of the determined results.

2. A photographic film loading method of loading an elongate photographic film at an apparatus which has a carrier for holding the photographic film to convey the photographic film along a conveying path and which effects photometry of each frame image of the photographic film at a predetermined position of the conveying path, comprising the steps of:

(a) spanning the photographic film between a supply reel and a winding reel;

(b) drawing-out an intermediate portion of the photographic film using drawing-out rollers, such that the drawing-out rollers are located adjacent to reserver rollers, said reserver rollers being fixed during the drawing-out of the photographic film;

(c) moving said reserver rollers in a longitudinal direction away from the drawing-out rollers, such that the intermediate portion of said photographic film is pressed against a first portion of said carrier, the first portion disposed so as to be fixed at said apparatus, (d) moving a second portion of said carrier between a first position at which the photographic film is held between the first portion and the second portion, the first and second portion forming the conveying path, and a second position, which is withdrawn from the first position such that release of the holding of the photographic film between the first portion and the second portion is permitted, drawing-out the intermediate portion of the photographic film between said supply reel and said winding reel while the second portion is located at the second position, so as to locate the intermediate portion on the conveying path; and (e) moving the second portion to the first position to hold the photographic film, thereby completing loading of the photographic film.

3. A film loading method according to claim 2, wherein in said step (a), the photographic film is spanned between said supply reel and said winding reel in accordance with a loading direction and a winding direction of the photographic film which are determined on the basis of a winding manner of the photographic film before the photographic film is loaded at said apparatus.

4. A film loading method according to claim 2, wherein the second portion is moved by being pivoted between the first position and the second position.

5. A film loading method according to claim 3, wherein said second portion is moved by being pivoted between the first position and the second position.

6. A film loading method according to claim 2, wherein said step (b) has a first drawing-out step and a second drawing-out step, and the intermediate portion is drawn-out to a predetermined position in the first drawing-out step, and the intermediate portion is pressed to the first portion so as to be located on the conveying path in the second drawing-out step.

7. A film loading method according to claim 3, wherein said step (b) has a first drawing-out step and a second drawing-out step, and the intermediate portion is drawn-out to a predetermined position in the first drawing-out step, and the intermediate portion is pressed to the first portion so as to be located on the conveying path in the second drawing-out step.

8. A film loading method according to claim 4, wherein said step (b) has a first drawing-out step and a second drawing-out step, and the intermediate portion is drawn-out to a predetermined position in the first drawing-out step, and the intermediate portion is pressed to the first portion so as to be located on the conveying path in the second drawing-out step.

9. A photographic film conveying apparatus having a conveying path and including a carrier which holds an elongate photographic film and conveys the photographic film along the conveying path in a longitudinal direction of the photographic film, comprising:

a fixed portion forming a portion of said carrier and fixed to said film conveying apparatus;

a movable portion forming the remaining portion of said carrier; and connecting means for automatically connecting said fixed portion and said movable portion and permitting pivoting of said movable portion to a first position, at which the photographic film located on the conveying path is held between said movable portion and said fixed portion so as to permit conveying of the photographic film, and to a second position, which is withdrawn from the first position and at which location of the photographic film on the conveying path and removal of the photographic film from the conveying path are permitted;

wherein said connecting means comprises:
    a shaft for pivotably connecting said fixed portion and said movable portion of said carrier;
    a motor to transmit a driving force to said shaft; and
    a controller for providing instructions to said motor when said photographic film is located on a conveying path on said fixed portion of said carrier, to drive said motor to pivot said movable portion of said carrier to said fixed portion of said carrier, to hold said photographic film between said movable portion and said fixed portion of said carrier.

10. A photographic film conveying apparatus according to claim 9, further comprising driving means for pivoting said movable portion to the first position and the second position through said connecting means.

11. A photographic film conveying apparatus according to claim 9, wherein said connecting means is a motor-controlled hinge.

12. A photographic film conveying apparatus according to claim 10, wherein said connecting means is a hinge.

13. An image reading apparatus which holds an elongate photographic film and conveys the photographic film along a conveying path and reads each frame image of the photographic film at a predetermined position of the conveying path, comprising:

a carrier having a fixed portion fixed to said image reading apparatus and a movable portion which can be pivoted to a first position, said fixed portion and said movable portion together in the first position forming the conveying path, the first position being at which the photographic film located on the conveying path is held between said movable portion and said fixed portion such that conveying of the photographic film is permitted, and to a second position, which is withdrawn from the first position such that location of the photographic film on the conveying path and removal of the photographic film from the conveying path are permitted;

a drawing-out mechanism including drawing-out rollers and reserver rollers, for, while the movable portion is located at the second position, drawing-out an intermediate portion of the photographic film using the drawing-out rollers into a first location spanned between a supply reel and a winding reel, then using the reserver rollers to move longitudinally away from the drawing-out rollers and draw-out the intermediate portion of photographic film into a second location wherein the photographic film presses the intermediate portion against the fixed portion and locates the intermediate portion on the conveying path; and a first drive device for pivoting the movable portion from the second position to the first position to hold the intermediate portion between the first portion and the second portion such that conveying of the photographic film is permitted.

14. An image reading apparatus according to claim 13, wherein said drawing-out means includes a first drawing-out means for pressing the intermediate portion to draw-out the intermediate portion to a predetermined position, and a second drawing-out means for further drawing-out the intermediate portion, which has been drawn-out by said first drawing-out means to the predetermined position, so as to press the intermediate portion against the fixed portion.

15. An image reading apparatus according to claim 14, wherein said first drawing-out means includes an arm, a first roller rotatably supported by one longitudinal direction end portion of said arm, and second drive means engaged with another end portion of said arm and operated to pivot said arm about the other end portion, and the intermediate portion is pressed by said first roller in accordance with the operation of said second drive means so as to be drawn-out to the predetermined position.

16. An image reading apparatus according to claim 15, wherein said second drawing-out means comprises a shaft member, a second roller rotatably supported by one longitudinal direction end portion of said shaft member, third drive means for moving said second roller to a third position at which said shaft member is extended in the longitudinal direction of said shaft member and a fourth position at which said shaft member is withdrawn in the longitudinal direction, and fourth drive means for supporting said third drive means and linearly moving said second roller through said third drive means between the third position and a fifth position at which the intermediate portion is pressed against the fixed portion through said second roller, wherein said shaft member is set in a withdrawn state by said third drive means when the intermediate portion is moved by said first drawing-out means to the predetermined position, and said second roller is moved to the fourth position by said third drive means after the intermediate portion is located at the predetermined position, and said second roller is moved by said fourth drive means from the fourth position to the fifth position with said second roller pressing the intermediate portion against the fixed portion, thereby locating the intermediate portion on the conveying path.

17. An image reading apparatus according to claim 13, further comprising connecting means for connecting the fixed portion and the movable portion and permitting pivoting of the movable portion with respect to the fixed portion.

18. An image reading apparatus according to claim 17, wherein said connecting means is a hinge.

19. A photographic film loading method of loading an elongate photographic film at an apparatus which has a carrier for holding the photographic film to convey the photographic film along a conveying path and which effects photometry of each frame image of the photographic film at a predetermined position of the conveying path, comprising the steps of:

(a) spanning the photographic film between a supply reel and a winding reel;

(b) said carrier having a first portion disposed so as to be fixed at said apparatus and a second portion movable between a first position, at which the photographic film located on the conveying path is held between the first portion and the second portion, and a second position, which is withdrawn from the first position such that release of the holding of the photographic film between the first portion and the second portion is permitted, drawing-out an intermediate portion of the photographic film between said supply reel and said winding reel while the second portion is located at the second position, so as to locate the intermediate portion on the conveying path; and (c) moving the second portion to the first position to hold the photographic film, thereby completing loading of the photographic film;

wherein in step (a), the photographic film is spanned between said supply reel and said winding reel in accordance with a loading direction and a winding direction of the photographic film which are determined on the basis of a winding manner of the photographic film before the photographic film is loaded at said apparatus.

20. A film loading method according to claim 19, wherein said second portion is moved by being pivoted between the first position and the second position.

21. A film loading method according to claim 19, wherein said step (b) has a first drawing-out step and a second drawing-out step, and the intermediate portion is drawn-out to a predetermined position in the first drawing-out step, and the intermediate portion is pressed to the first portion so as to be located on the conveying path in the second drawing-out step.

22. An image reading apparatus which holds an elongate photographic film and conveys the photographic film along a conveying path and reads each frame image of the photographic film at a predetermined position of the conveying path, comprising:

a carrier having the conveying path, said carrier having a fixed portion fixed to said image reading apparatus and a movable portion which can be pivoted to a first position, at which the photographic film located on the conveying path is held between said movable portion and said fixed portion such that conveying of the photographic film is permitted, and to a second position, which is withdrawn from the first position such that location of the photographic film on the conveying path and removal of the photographic film from the conveying path are permitted;

drawing-out means for, while the movable portion is located at the second position, drawing-out an intermediate portion of the photographic film spanned between a supply reel and a winding reel to press the intermediate portion against the fixed portion and to locate the intermediate portion on the conveying path; and a first drive device for pivoting the movable portion from the second position to the first position to hold the intermediate portion between the first portion and the second portion such that conveying of the photographic film is permitted;

wherein said drawing-out means includes a first drawing-out means for pressing the intermediate portion to draw-out the intermediate portion to a predetermined position, and a second drawing-out means for further drawing-out the intermediate portion, which has been drawn-out by said first drawing-out means to the predetermined position, so as to press the intermediate portion against the fixed portion; and wherein said first drawing-out means includes an arm, a first roller rotatably supported by one longitudinal direction end portion of said arm, and second drive means engaged with another end portion of said arm and operated to pivot said arm about the other end portion, and the intermediate portion is pressed by said first roller in accordance with the operation of said second drive means so as to be drawn-out to the predetermined position; and wherein said second drawing-out means comprises a shaft member, a second roller rotatably supported by one longitudinal direction end portion of said shaft member, third drive means for moving said second roller to a third position at which said shaft member is extended in the longitudinal direction of said shaft member and a fourth position at which said shaft member is withdrawn in the longitudinal direction, and fourth drive means for supporting said third drive means and linearly moving said second roller through said third drive means between the third position and a fifth position at which the intermediate portion is pressed against the fixed portion through said second roller, wherein said shaft member is set in a withdrawn state by said third drive means when the intermediate portion is moved by said first drawing-out means to the predetermined position, and said second roller is moved to the fourth position by said third drive means after the intermediate portion is located at the predetermined position, and said second roller is moved by said fourth drive means from the fourth position to the fifth position with said second roller pressing the intermediate portion against the fixed portion, thereby locating the intermediate portion on the conveying path.

23. A photographic film loading method of loading a photographic film on an apparatus which effects photometry of a frame image on the photographic film, wherein determining the loading direction and the winding direction of a photographic film comprises inputting information regarding the loading direction of the photographic film written on an LSI card into a controller such that the controller can control the loading of the photographic film on the apparatus.

* * * * *

UNITED STATES PATENT AND TRADEMARK OFFICE
CERTIFICATE OF CORRECTION

PATENT NO. : 5,880,819
DATED : March 9, 1999
INVENTOR(S) : Shigeru TANAKA and Takehisa OHNO It is certified that error appears in the above-identified patent and that said Letters Patent is hereby corrected as shown below:

On the title page item [56],

United Kingdom Patent No. to read --65222<u>8</u>-- and delete

Signed and Sealed this

Fourth Day of January, 2000

Attest:

*Attesting Officer*   *Acting Commissioner of Patents and Trademarks*